United States Patent
Lowe et al.

(10) Patent No.: US 10,376,776 B2
(45) Date of Patent: Aug. 13, 2019

(54) SYSTEMS AND METHODS FOR PROVIDING A VIDEO GAME USING INFORMATION STORED BY PHYSICAL OBJECTS

(71) Applicant: DISNEY ENTERPRISES, INC., Burbank, CA (US)

(72) Inventors: Robert Lowe, Burbank, CA (US); Robert Nelson, Burbank, CA (US); John G. Vignocchi, Studio City, CA (US); Jeffrey Gosztyla, Salt Lake City, UT (US)

(73) Assignee: Disney Enterprises, Inc., Burbank, CA (US)

( * ) Notice: Subject to any disclaimer, the term of this patent is extended or adjusted under 35 U.S.C. 154(b) by 281 days.

(21) Appl. No.: 15/002,068

(22) Filed: Jan. 20, 2016

(65) Prior Publication Data

US 2017/0203204 A1    Jul. 20, 2017

(51) Int. Cl.
*A63F 13/20*    (2014.01)

(52) U.S. Cl.
CPC .................................... *A63F 13/20* (2014.09)

(58) Field of Classification Search
CPC ...................................................... A63F 13/20
See application file for complete search history.

(56) References Cited

U.S. PATENT DOCUMENTS

| | | | | |
|---|---|---|---|---|
| 5,766,077 A | * | 6/1998 | Hongo | A63F 13/02 273/148 B |
| 7,081,033 B1 | * | 7/2006 | Mawle | A63F 13/02 446/175 |
| 7,266,847 B2 | | 9/2007 | Pauker | |
| 7,739,371 B2 | | 6/2010 | Ikegaya | |
| 8,831,228 B1 | | 9/2014 | Agrawal | |

(Continued)

FOREIGN PATENT DOCUMENTS

WO    2007101785 A1    9/2007

OTHER PUBLICATIONS

Kloster, Benjamin, 'Wanted: Encryption Scheme for Copy Protection Purposes', Retrieved from the Internet http://stackoverflow.com/questions/14529732/wanted-encrYption-scheme-for-copy-protection-purposes, Jan. 25, 2013, XP055152568, 2 pages.

(Continued)

*Primary Examiner* — Corbett B Coburn
(74) *Attorney, Agent, or Firm* — Esplin & Associates, PC

(57) ABSTRACT

A system and method for providing a video game using information stored by physical objects are disclosed. The video game may take place in a virtual space. Users may access the virtual space via client computing platforms. Users may participate in the video game by controlling game entities in the virtual space. Individual ones of the game entities may be associated with individual physical objects. The information stored by individual physical objects may be implemented by virtue of a client computing platform receiving the stored information. The information may be implemented independently from gameplay in the virtual space using the associated game entity. For example, a physical object may store information related to a "limited edition" version of an associated game entity that may only be implemented in the virtual space by virtue of the information being received from the physical object.

16 Claims, 3 Drawing Sheets

(56) References Cited

U.S. PATENT DOCUMENTS

| | | | |
|---|---|---|---|
| 8,894,462 B2* | 11/2014 | Leyland | A63F 13/02 446/175 |
| 9,008,310 B2 | 4/2015 | Nelson | |
| 2003/0027636 A1* | 2/2003 | Covannon | G06F 3/002 463/42 |
| 2005/0059483 A1* | 3/2005 | Borge | A63F 13/02 463/29 |
| 2008/0148067 A1 | 6/2008 | Sitrick | |
| 2008/0309010 A1* | 12/2008 | Bowling | A63F 3/00697 273/243 |
| 2009/0069084 A1* | 3/2009 | Reece | A63F 13/10 463/32 |
| 2009/0137323 A1* | 5/2009 | Fiegener | A63H 3/28 463/43 |
| 2010/0033427 A1* | 2/2010 | Marks | G06F 3/0304 345/156 |
| 2011/0098092 A1* | 4/2011 | Reiche, III | A63F 13/65 463/1 |
| 2012/0295703 A1 | 11/2012 | Reiche | |
| 2012/0295704 A1* | 11/2012 | Reiche | A63F 13/06 463/31 |
| 2013/0296058 A1* | 11/2013 | Leyland | A63F 13/95 463/42 |
| 2014/0100029 A1* | 4/2014 | Reiche | A63F 13/12 463/31 |
| 2014/0162785 A1* | 6/2014 | Reiche | A63F 13/12 463/35 |
| 2014/0179446 A1* | 6/2014 | Zuniga | A63F 9/24 463/47 |
| 2014/0274313 A1* | 9/2014 | Bala | G06Q 30/06 463/25 |
| 2014/0364240 A1* | 12/2014 | Leyland | A63H 3/003 463/43 |
| 2015/0003609 A1 | 1/2015 | Nelson | |
| 2015/0024852 A1 | 1/2015 | Pacey | |
| 2015/0080125 A1* | 3/2015 | Andre | A63F 3/00075 463/31 |
| 2015/0174479 A1* | 6/2015 | Reiche | A63F 13/95 463/31 |
| 2015/0238854 A1* | 8/2015 | Olson | A63F 13/235 463/42 |
| 2016/0206959 A1* | 7/2016 | Nelson | A63F 13/58 |
| 2016/0310839 A1* | 10/2016 | Leyland | A63F 13/23 |
| 2017/0106288 A1* | 4/2017 | Reiche | A63F 13/12 |
| 2017/0113129 A1* | 4/2017 | Doptis | A63F 13/214 |
| 2017/0113131 A1* | 4/2017 | Doptis | A63F 13/24 |

OTHER PUBLICATIONS

Dagamant, 'Skylanders Hacking', Retrieved from the Internet http://web.archive.ora/web/20120309212642/http://www,suncries.com/skvlaners-hacking, Feb. 27, 2012, XP055152538, 8 pages.

Extended European Search Report issued in European Patent Application No. 14175300.4, dated Nov. 19, 2014. (6 pgs).

"Sun CriesSun Cries", http://web.archive.org, Mar. 9, 2012 (Mar. 9, 2012), XP055152538, Retrieved from the Internet: URL:http://web.archive.org/web/20120309212642/http://www.suncries.com/skylanders-hac king [retrieved on Nov. 12, 2014] (8 pgs).

"Video Game/ Battle Circuit", TV Tropes, available at «https://web.archive.org/web/20150114005112/http://tvtropes.org/pmwiki/pmwiki.php/VideoGameBattleCircuit» (4 pages).

"Battle Circuit", Capcom, available at «https://web.archive.org/web/20000111 073021 / http://www.capcom.co.jp/newproducts/arcade/battle/bs-top. html» (Orig in al Japanese web page followed by English translation), 4 pages.

\* cited by examiner

SYSTEMS AND METHODS FOR PROVIDING A VIDEO GAME USING INFORMATION STORED BY PHYSICAL OBJECTS

FIELD OF THE DISCLOSURE

This disclosure relates to providing a video game using information stored by physical objects, wherein the information includes a parameter value for a parameter of a game entity used in the video game, and wherein the parameter value sets the value of the parameter for the game entity in the virtual space independently from gameplay using the game entity.

BACKGROUND

Relating physical objects to virtual spaces can enrich a user's experience with both the physical object and the virtual space. The physical objects may be used to store information relating to a game entity associated with the physical object and the virtual space. The virtual space may include a video game taking place in the virtual space. The physical objects may depict a game entity (e.g., virtual character) used in the virtual space and/or video game that takes place in the virtual space. The information stored by the physical objects may include information related to gameplay using the associated game entity in the virtual space. For example, a game entity may include parameter values of one or more parameters (e.g., related to one or more of appearance, abilities, behaviors, and/or other parameters). Gameplay using the game entity may cause one or more parameter values to change. For example, a change may include an upgrade through one or more achievements during gameplay. The information related to an upgrade may be communicated to, and stored by, the physical object. This may allow a user to physically transport information related to gameplay using the game entity via the physical object. The user may then "download" the stored information to a client computing platform such that the most up-to-date version of their game entity (e.g., upgraded parameter values of one or more parameters, and/or other information) may be implemented in the virtual space. In some implementations, information exchange between the physical objects and a client computing platform used to access the virtual space may be accomplished via radio-frequency communication (e.g., through an RFID tag within the physical object, and an RFID reader attached to the client computing platform) and/or other communication schemes.

SUMMARY

One aspect of the disclosure relates to a system for providing a video game using information stored by physical objects. The information stored by the physical objects may include information that may be implemented in the virtual space independent of gameplay using the associated game entity in the virtual space, and/or other information. For example, a physical object may store a parameter value for a parameter of the associated game entity. The parameter value may be used to set the value of the parameter for the game entity in the virtual space independently from gameplay in the virtual space. In some implementations, the parameter value may be a value that may not be available and/or otherwise achievable via gameplay in the virtual space. As such, in some implementations, the information stored by the physical objects may be used to introduce new content (e.g., new parameter values) into the virtual space.

In other words, a parameter value for a parameter for a game entity stored by a physical object may be associated with one or more of a "limited edition," special release, and/or other limited version of the game entity. By way of non-limiting example, such content may be associated with one or more of an appearance, game entity behavior, special visual effects, special skills, special weapons made available to the game entity, and/or other content.

In some implementations, the system may include one or more processors configured by machine-readable instructions, and/or other components. The machine-readable instructions may include one or more computer program components. The computer program components may include one or more of a space component, a receiving component, and/or other components.

The space component may be configured to execute an instance of a virtual space and/or a video game taking place in the virtual space. The space component may be configured to implement the instance of the virtual space to facilitate user participation in the virtual space and/or video game. User participation include controlling game entities. Individual ones of the game entities may be associated with physical objects that store information about the game entities. For example, a physical object may embody the physical appearance of an associated game entity (e.g., a toy figurine and/or other from factors).

The receiving component may be configured to receive information stored by the physical objects from a reader operatively coupled to or included with the one or more processors. The information received from the reader may include a parameter value for a parameter of a game entity associated with a given physical object, and/or other information. The parameter value stored by the given physical object may set the value of the parameter for the associated game entity in the virtual space independently from gameplay using the associated game entity.

In this manner, the space component may be configured to implement the received information in the instance of the virtual space. For example, the parameter value stored by the given physical object may be implemented by the space component in the virtual space as the value of the parameter for the game entity.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The embodiments will be more readily understood in view of the following description when accompanied by the below figures and wherein like reference numerals represent like elements, wherein.

DETAILED DESCRIPTION

Figure 1:
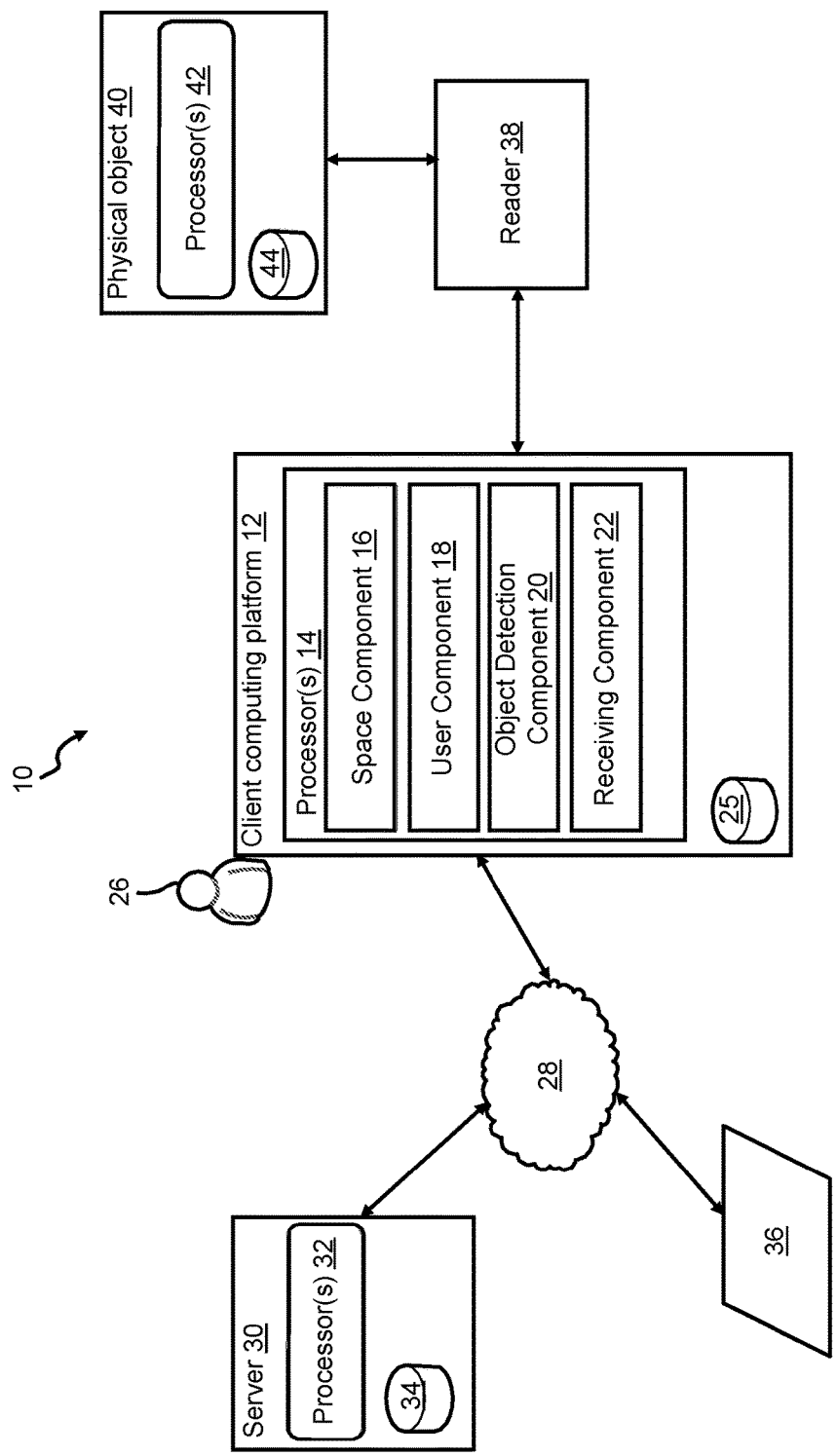
FIG. 1 illustrates an implementation of a system for providing a video game using information stored by physical objects.

FIG. 1 illustrates a system 10 for providing a video game using information stored by physical objects. The video game may take place in a virtual space. In some implementations, the video game may be an online game. The video game (e.g., online game) may be hosted by a host server (e.g., server 30) over a network 28, such as the Internet, and/or other networks. The video game may be accessed by users via client computing platforms, such as client computing platform 12.

In some implementations, the video game may be an "offline" version of the online game (e.g., facilitating offline gameplay). The video game may be a console game. The virtual space may be hosted locally on the client computing platforms associated with the users. For example, in some implementations, the virtual space may be hosted locally at client computing platform 12 associated with a user 26 and/or other users.

User participation in the video game may include controlling game entities in the virtual space. A game entity may refer to a virtual object (or group of objects) present in the virtual space that represents an individual user. A game entity may be a virtual character (e.g., an avatar) and/or other virtual object. A group of game entities may include a group of virtual characters, virtual objects, and/or other considerations.

In some implementations, individual ones of the game entities may be associated with physical objects. Individual physical objects may store information associated with individual game entities. A given physical object may store information related to one or more parameters of the associated game entity in the virtual space. An individual physical object may store one or more parameter values of one or more parameters of an associated game entity. Individual parameters of a game entity may include one or more of an appearance parameter related to the visual appearance of the game entity in the virtual space; a behavior parameter related to the behavior of the game entity in the virtual space; an ability parameter related to one or more of a skill, ability, and/or weapon available for use by the game entity in the virtual space; a special effects parameter related to one or more of special visual effects, attack effects, and/or defensive effects for game entity in the virtual space; and/or other parameters.

In some implementations, a parameter value for a parameter of a game entity stored by a physical object may set the value of the parameter for the given game entity in the virtual space. In some implementations, a parameter value may be implemented in the virtual space independently from gameplay associated with the game entity in the virtual space. For example, in some implementations, a parameter value of a parameter of a game entity may be determined based on gameplay in the virtual space using the game entity (e.g., the user achieves an upgrade in the virtual space that determines a parameter value for a parameter of the game entity). Based on receiving information stored by a physical object that includes a different parameter value for the same parameter, the received parameter value may override, change, and/or otherwise set the value for the parameter in the virtual space. In some implementations, if no parameter value for a given parameter of a game entity based on gameplay exists, the parameter value received from the physical object may be used to determine and/or set the value for the parameter. In some implementations, individual parameter value stored by individual physical objects may be values that may not otherwise be implemented in the virtual space absent receiving such parameter values from the individual physical objects.

In some implementations, individual physical objects may be physical representations of individual game entities associated therewith. A given physical object may be a toy figurine embodying the appearance of an associated game entity, and/or may have other form factors. In some implementations, physical objects may be detectable by client computing platforms via readers that are operatively coupled to or included in the client computing platforms (e.g., coupled to or included with one or more physical processors included in the client computing platforms). The readers may facilitate communication and/or information exchange between one or more of the physical objects, client computing platforms, server, and/or other entities participating in system 10.

In some implementations, the system 10 may include physical object 40. The physical object 40 may be associated with a first game entity (not shown). Physical object 40 may include one or more of one or more processor 42, electronic storage 44, and/or other components. The first game entity may be associated with user 26. The physical object 40 may be used by user 26 when accessing the virtual space and/or video game via client computing platform 12 and/or other client computing platforms. The physical object 40 may be detectable by a reader 38 that is operatively coupled to or included with one or more processors 14 of client computing platform 12. The physical object 40 may be detectable by reader 38 based on a signal conveying information associated with and/or stored by physical object 40. For example, the physical object 40 may include a radio-frequency identification (RFID) tag (not shown) and/or other component(s) configured to emit radio-frequency (RF) communications responsive to the physical object 40 being disposed in proximity to reader 38 and/or client computing platform 12. The RF communications may include information indicative of the physical presence of physical object 40 (e.g., identification information) and/or information stored by physical object 40 (e.g., a parameter value). The reader 38 may be configured to detect and/or receive the RF communications.

In some implementations, providing the virtual space may include hosting the virtual space on client computing platforms. An instance of the virtual space may be hosted on client computing platform 12. Briefly, although the following description is directed towards client computing platform 12, it is to be understood that the client computing platforms in general may be similarly configured and/or may include the same or similar components as client computing platform 12 in order to carry out the same or similar functions and/or features attributed to client computing platform 12.

In some implementations, client computing platform 12 may comprise one or more of a gaming console, a mobile device, a smartphone, a tablet, a PC, and/or other computing platforms. Client computing platform 12 may be configured to execute an instance of the virtual space and/or video game taking place in the virtual space by using information stored by and/or local to client computing platform 12 (e.g., a game cartridge, game disk, memory card/stick, USB memory stick, electronic storage, and/or other considerations) and/or other information. In some implementations, client computing platform 12 may be configured to execute an instance of the virtual space and/or video game using information received from server 30 and/or other entities participating in system 10. In some implementations, client computing platform 12 may be configured to communicate with server 30, for example, over network 28.

Client computing platform 12 may include one or more processors 14 configured by machine-readable instructions. Executing the machine-readable instructions may cause the one or more processor 14 to facilitate implementing an instance of the virtual space and/or a video game taking place within the virtual space and to facilitate participation of user 26 and/or other users in instance. The computer program components of may include one or more of a space component 16, a user component 18, an object detection component 20, a receiving component 22, and/or other components.

In some implementations, some or all of the functionality of client computing platform 12 may be attributed to server 30. In such implementations, providing the virtual space may include hosting the virtual space over the network 28. The server 30 may include one or more processors 32 configured by machine-readable instructions for implementing an instance of the virtual space and/or a video game taking place within the virtual space and to facilitate the participation of one or more users in the virtual space and/or the video game (e.g., online game). Processors 32 may be configured to execute the same or similar components as presented for client computing platform 12, and/or other considerations. The users may access server 30 and/or the virtual space via client computing platforms. Server 30 may include electronic storage 34.

The some implementations of online gameplay and/or other gameplay, server 30 may be configured to determine state of the virtual space. The state may then be communicated (e.g., via streaming visual data, via object/position data, and/or other state information) from server 30 to client computing platform 12 and/or other client computing platforms for presentation to user 26 and/or other users. Server 30 may be attributed with more or less functionality described herein for client computing platform 12 in order for server 30 to execute an instance of the virtual space and/or video game as presented herein.

Referring back to client computing platform 12, the space component 16 may be configured to execute and implement an instance of the virtual space. The instance of the virtual space may be executed by the computer components to determine state of the virtual space. The state determined and presented by client computing platform 12 may correspond to a location in the virtual space (e.g., location in the game). The view described by the state may correspond, for example, to the location from which the view is taken, the location the view depicts, and/or other locations, a zoom ratio, a dimensionality of objects, a point-of-view, and/or view parameters of the view. One or more of the view parameters may be selectable by user 26.

An instance of the virtual space may comprise a simulated space that is accessible by user 26 and/or other users via a client (e.g., client computing platform 12 and/or other client computing platforms) that presents the views of the virtual space to user 26 and/or other users. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space (e.g., comprising at least part of a virtual terrain). In some instances, the topography may describe a volume with one or more bodies positioned therein (e.g., a simulation of gravity-deprived space with one or more celestial bodies positioned therein). An instance executed by the computer components may be synchronous, asynchronous, and/or semi-synchronous.

The above description of the manner in which state of the virtual space is determined by space component 16 is not intended to be limiting. The space component 16 may be configured to express the virtual space in a more limited, or richer, manner. For example, views determined for the virtual space representing the state of the instance of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by space component 16, user 26 may control game entities, groups of game entities, simulated physical phenomena (e.g., wind, rain, earthquakes, and/or other phenomena), and/or other elements within the virtual space to interact with the virtual space and/or other users. The game entities may include virtual characters, such as avatars, group entities, and/or other considerations. A given game entity may be controlled by user 26 with which it is associated. The user controlled element(s) may move through and interact with the virtual space (e.g., non-user characters in the virtual space, other objects in the virtual space). The user controlled elements controlled by and/or associated with user 26 may be created and/or customized by user 26, based on information received by client computing platform 12 (e.g., from server 30), and/or may be based on other information. User 26 may have an "inventory" of virtual items, game entities, and/or currency that user 26 can use (e.g., by manipulation of a virtual character or other user controlled element, and/or other items) within the virtual space.

User 26 and/or other users may participate in the instance of the virtual space by controlling one or more of the available user controlled game entities in the virtual space. Control may be exercised through control inputs such as entry, selection, and/or commands input by user 26 and/or other users through client computing platform 12 and/or other client computing platforms. Other users may interact with user 26 and/or other users through communications exchanged within the virtual space. Such communications may include one or more of textual chat, instant messages, private messages, voice communications, and/or other communications. Communications may be received and entered by the users via their respective client computing platforms. Communications may be routed to and from the appropriate users through network 28 and/or through communications which are external to the system 10 (e.g., text messaging services associated with the users).

The instance of the virtual space and/or the online game that takes place therein may be persistent. That is, the virtual space and/or the game may continue on whether or not individual players are currently logged in and/or participating in the game. A player that logs out of the virtual space and then logs back in some time later may find the virtual space has been changed through the interactions of other players with the virtual space during the time the player was logged out. These changes may include changes to the simulated physical space, changes in the user's inventory, changes in other user's inventories, changes experienced by non-player characters, changes to the virtual items available for use in the online game, and/or other changes.

Within the instance of the video game and/or virtual space executed by the space component 16, information may be implemented in the video game and/or virtual space responsive to presence of physical objects (e.g., physical object 40) on and/or near reader 38 that is operative coupled to or included in one or more of client computing platform 12, server 30, and/or entity participating in system 10. Such information may implemented when individual physical objects are present on reader 38.

For example, a game entity may not be provided in the instance of the virtual space when a corresponding physical object is not present on reader 38; but will be provided in the instance of virtual space when the physical object is present on reader 38. For such selective implementation of the instance of the virtual space, the space component 16 may be configured to implement the information associated with the game entity responsive to the physical object being present on reader 38. For example, the space component 16 may be configured to implement a parameter value for a first parameter of the first game entity associated with physical object 40 into the instance of the virtual space by virtue of physical object 40 storing the parameter value and responsive to physical object 40 being present on reader 38.

In FIG. 1, the user component 18 may be configured to access and/or manage one or more user profiles, user information, and/or user accounts associated with user 26 and/or other users. The one or more user profiles and/or user information may include information stored locally to client computing platform 12, by server 30, one or more other client computing platforms, and/or other storage locations. The user profiles may include, for example, information identifying users (e.g., a username or handle, a number, an identifier, and/or other identifying information) within the virtual space, security login information (e.g., a login code or password), virtual space account information, subscription information, virtual (or real) currency account information (e.g., related to currency held in credit for a user), control input information (e.g., a history of control inputs provided by the user), virtual inventory information (e.g., virtual inventories associated with the users that include one or more virtual items available for the users in the virtual space and/or a game entity available to the user for use in the virtual space), relationship information (e.g., information related to relationships between users in the virtual space), virtual space usage information (e.g., a log-in history indicating the frequency and/or amount of times the user logs-in to the user accounts), demographic information associated with users, interaction history among users in the virtual space, information stated by users, browsing history of users, a client computing platform identification associated with a user, a phone number associated with a user, and/or other information related to users.

The object detection component 20 may be configured to receive identification information indicating presence of one or more physical objects detected by reader 38. The identification information may differ from other information stored by the physical objects (e.g. parameter values) in that the identification information may not be related to an implementation of the game entities associated with physical objects in the virtual space, but may merely be information used to identify the physical objects for indicating presence (e.g., a bar code, tag ID, a serial number, and/or other information). The reader 38 may be operatively included with or coupled to client computing platform 12 (e.g., with one or more processor 14) via any suitable wired or wireless communication through, such as but not limited to, universal serial bus (USB), Bluetooth, parallel ports, FireWire, Infrared, 3DS reader, and/or any other suitable wired or wireless communication. The reader 38 may obtain information stored on one or more physical objects, such as identification information of the physical objects, information about one or more game entities that are associated with the physical objects, and/or any other information stored on the physical objects. The reader 38 may obtain such information from the physical objects through technologies such as, RFID, NFC, Bluetooth, and/or any other communication technologies suitable for reading information stored on a physical object by reader 38.

In some implementations, the object detection component 20 may be configured to receive the identification information stored on the physical object(s) from reader 38 at a sampling rate preconfigured by the provider developer, manufacturer and/or any other entities related to the system 10. Simultaneously or alternatively, the object detection component 20 may be configured to receive such information from reader 38 dynamically as information is being pushed to the client computing platform 12 by reader 38.

In some implementations, identification information received by the object detection component 20 from reader 38 may comprise identification information about a physical object whose presence may be detected by the reader 38. Identification information may include one or more of a tag ID associated with a physical object, a name of a physical object, a bar code associated with a physical object, a serial number, and/or any other identification information.

Figure 2:
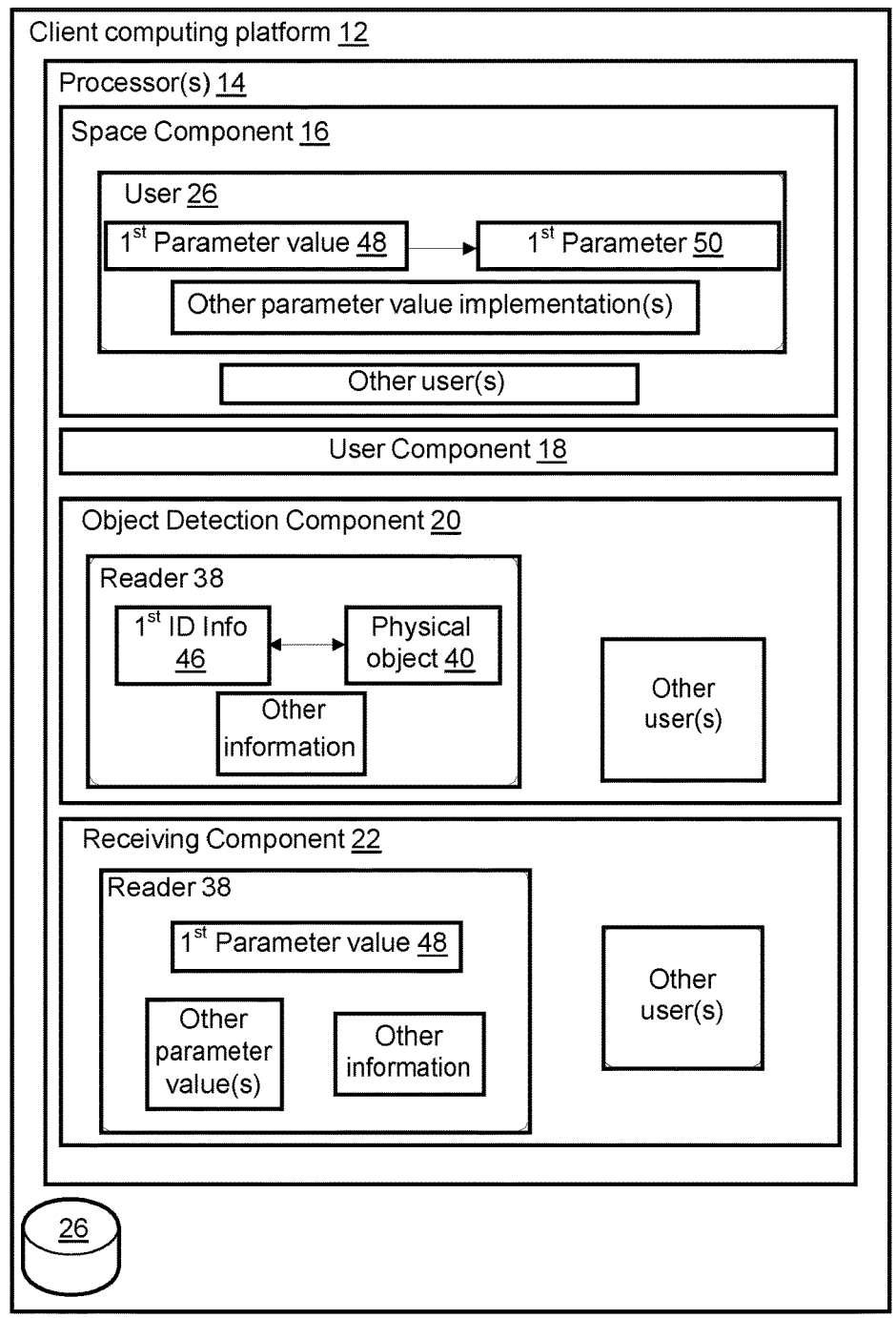
FIG. 2 illustrates an implementation of a client computing platform used in the system of FIG. 1.

As an illustrative example in FIG. 2, the object detection component 20 may be configured to receive first identification information 46 from reader 38. First identification information 46 may be information that identifies physical object 40. The object detection component 20 may be configured to determine presence of physical object 40 based on first identification information 46.

Returning to FIG. 1, in some implementations, the receiving component 22 may be configured to receive information related to game entities stored by the physical objects from reader 38 that detects the physical objects. In some implementations, the receiving component 20 may be configured to receive the information stored on the physical object(s) from reader 38 at a sampling rate preconfigured by the provider developer, manufacturer and/or any other entities related to the system 10.

The information received by receiving component 22 may include information about game entities that are associated with the physical objects and/or the users of the physical objects. In some implementations, the received information may include a parameter value for a parameter of a game entity associated with a given physical object. For example, receiving component 22 may receive a parameter value for a first parameter (e.g., first parameter 50 shown in FIG. 2) of the first game entity associated with physical object 40 and/or user 26. The parameter value stored by physical object 40 may be used to set the value of the first parameter for the first game entity in the virtual space. The parameter value stored by physical object 40 may be used to set the value of the first parameter in the virtual space independently from gameplay using the first game entity. For example, the parameter value stored by physical object 40 may override, change, determine, and/or otherwise set the value for the first parameter of the first game entity in the virtual space.

In some implementations, parameters of a game entity may include one or more of an appearance parameter related to the visual appearance of the game entity in the virtual space; a behavior parameter related to the behavior of the game entity in the virtual space; an ability parameter related to one or more of a skill, ability, and/or weapon available for use by the game entity in the virtual space; a special effects parameter related to one or more of special visual effects, attack effects, defensive effects, and/or other effects for game entity in the virtual space; and/or other parameters.

By way of non-limiting illustration, a value of an appearance parameter may determine one or more visual attributes of the first game entity and/or other game entities in the virtual space. For example, the appearance parameter may be related to one or more of a color of the game entity, a height of the game entity, a limb length of the game entity (e.g., if the game entity has limbs), a translucency of the game entity, a surface material (e.g. metallic vs. non-metallic and/or other considerations) of the game entity, a lighting property of the game entity, and/or other visual attribute that is associated with the game entity in the virtual space.

In some implementations, a parameter value for a appearance parameter may include one or more of a color value defining the color, a height value defining the height, a limb length value defining the limb length, a translucency value defining the translucency, a surface material value defining an attribute of the surface material, a lighting property value defining the lighting property, and/or other value defining other visual attributes.

In some implementations, a parameter value for a appearance parameter and/or other parameters may be a value that may not be achievable and/or otherwise accessible via gameplay in the virtual space with the game entity. For example, the parameter value for the appearance parameter and/or other parameters stored by physical object 40 may only be implemented in the virtual space by virtue of the parameter value being stored by physical object 40 and received through detections facilitated by reader 38. As such, the parameter value for the appearance parameter and/or other parameter may be associated with a "limited edition" color and/or other limited version of the first game entity to be implemented in the virtual space by virtue of physical object 40 being detected.

In some implementations, the parameter value for the appearance parameter may be a qualitative value and/or quantitative value. For example, a qualitative color value may include or more of "green", "red", "blue", "yellow", "bright green", "dark blue", "neon red", and/or other considerations of qualitative expressions that may be used to define a color of a game entity in the virtual space. In some implementations, a color value may be a quantitative value. A quantitative color value may be related to a quality of the color that may be determined by a numerical value, and/or other considerations. For example, a quantitative color value may a value on a numerical scale from 1 to 10 related to the brightness of the color (or other attribute). For example, a "1" color value may represented a color being the least bright and "10" being the most bright, and/or other considerations. Quantitative color values may be related to other attributes of color that may be determined based on numerical scale such as hue, richness, contrast, and/or other considerations. Quantitative and/or qualitative color values may be considered in other ways.

In some implementations, a qualitative height value defining the height of a game entity may include one or more of "tall", "short", "medium tall", "medium short", "very tall", "very short", and/or other considerations of qualitative expressions that may be used to define a height of a game entity in the virtual space. In some implementations, qualitative height value may be considered relative to a given game entity. For example, a game entity may be dwarf character which his typically associated with a virtual character of short stature, and/or other considerations. Therefore, terms such as "tall" or "very tall" may be relative to known characteristics of the given game entity. In some implementations, a quantitative height value may include a numerical value that corresponds to one or more units of measurement in the virtual space, and/or other considerations. For example a quantitative height value may be "10 units", and/or other considerations. Qualitative and/or quantitative height values may be considered in other ways.

In some implementations, qualitative and/or quantitative parameter values for limb length may be considered using units of measurement the same or similar way that height values may be considered as presented herein, and/or other considerations. For example, a qualitative limb length value may be "long", "short", and/or other considerations of qualitative expressions that may be used to define a limb length of a game entity in the virtual space. A quantitative limb length value may be, for example, "6 units" or other amount and/or other considerations of a numerical value used to determine a limb length. Qualitative and/or quantitative limb length values may be considered in other ways.

In some implementations, a qualitative translucency value defining the translucency of a game entity may include one or more of "translucent", "not translucent", "more translucent", "less translucent", and/or other considerations of qualitative expressions that may be used to define a translucency of a game entity in the virtual space. In some implementations, a quantitative translucency value may be based on a numerical value, a percentage, scale, and/or other considerations. For example a quantitative translucency value may a value on a numerical scale from 1 to 10 (or other value and/or scale), wherein 1 may be completely opaque (e.g., not translucent) and 10 may be completely transparent, and/or other considerations. Qualitative and/or quantitative translucency values may be considered in other ways.

In some implementations, a qualitative surface material value defining an attribute of a surface material of a surface of a game entity may be a description of the surface material, and/or other considerations. For example, a qualitative surface material value may include one or more of "metal", "wood", "plastic", "shiny", "rough", "spikey", "smooth", "bumpy", and/or other considerations of qualitative expressions that may be used to define a surface material of a game entity in the virtual space. Qualitative and/or quantitative surface material values may be considered in other ways.

In some implementations, a qualitative lighting property value defining the lighting property of a game entity in the virtual space may be related to how the game entity is lit and/or emits light in the virtual space, the overall visibility of the game entity in the virtual space, and/or other considerations. For example, a qualitative lighting property may include one or more of "bright", "brighter", "less bright", "dark", "darker", "less dark", "glow", and/or other considerations of qualitative expressions that may be used to define a lighting property of a game entity in the virtual space. For example, a "glow" may be associated with a visible "aura" surrounding the game entity in the virtual space. In some implementations, a quantitative lighting property value may include a numerical value, percentage, and/or scale that is representative of an amount or degree of lighting of the game entity. For example a quantitative lighting property value may be a value on a numerical scale from 1 to 10, wherein 1 may correspond to the game entity being visualized as a completely black or dark entity and 10 may correspond to the game entity having a brightly glowing visible aura in the virtual space. Qualitative and/or quantitative lighting property values may be considered in other ways.

In some implementations, a parameter value of a behavior parameter may define one or more behavior attributes of the first game entity in the virtual space. For example, the behavior parameter may be related to one or more of a speed of a movement of a game entity in the virtual space (e.g. walking, running, and/or other considerations), a hit reaction (e.g., a visible reaction to offensive attacks against the game entity), a collection bonus (e.g., a multiplier and/or other bonus associated with the collection of virtual items and/or currencies, resource harvesting and/or other collection by the game entity in the virtual space), and/or other behavioral attribute associated with a game entity in the virtual space.

In some implementations, a parameter value for a behavior parameter may include one or more of a speed value defining the speed, a hit reaction value defining a hit reaction, a collection bonus value defining a multiplier and/or other bonus, and/or other value defining other behavioral attributes. In some implementations, parameter values for the behavior parameter may be qualitative and/or quantitative values.

In some implementations, a qualitative speed value may include one or more of "fast", "slow", "faster", "slower", and/or other considerations of qualitative expressions that may be used to define a speed of a game entity in the virtual space, and/or other considerations. In some implementations, a quantitative speed value may include a numerical value, percentage, and/or scale that is representative of the speed of the game entity. For example a quantitative speed value may a value on a numerical scale from 1 to 10, where 1 may be the slowest speed and 10 may be the fastest speed, and/or other considerations. In some implementations, a quantitative speed value may include a numerical value that corresponds to one or more units of measurement for speed. For example, the virtual space may be associated with units of measurement related to a distance traveled through the virtual space over unit time and/or other unit of measurement that may be representative of speed of game entities in the virtual space, and/or other considerations. Qualitative and/or quantitative speed values may be considered in other ways.

In some implementations, a hit reaction value may correspond to how a game entity visually responds in the virtual space to offensive "hits" or attacks against the game entity (e.g., from other users and/or from artificial intelligence controlled game entities). For example, a qualitative hit reaction value may correspond to one or more of "react", "do not react", "spin", "fall to the ground", "get angry", "get sad", "grow larger", "hide", "run away", "perform [a defensive block]", and/or other qualitative expressions. In some implementations, a quantitative hit reaction value may include a numerical value that corresponds to a hit reaction performed by the game entity. For example, a game entity may have a hit reaction where the game entity spins around a number of times in the virtual space, and/or perform a different hit reaction. The number of spins may be determined based on a quantitative hit reaction value, e.g., "3" spins (or other amount). Qualitative and/or quantitative speed values may be considered in other ways.

In some implementations, a collection bonus value may be a qualitative or quantitative value defining a multiplier and/or other value associated with the collection of virtual items and/or currencies in the virtual space by the game entity (e.g., resource harvesting) and/or other collection by the game entity in the virtual space. For example, a game entity may harvest virtual resources, such as a virtual food or other virtual item, in the virtual space. Harvesting virtual resources may require a predetermined amount of time to pass per unit resource before the resource can be collected by the game entity and/or stored in a virtual inventory. In some implementations, a quantitative collection bonus value may be a multiplier such as "2×", "3×", "4×", and/or other value that is used to define a speed-up of harvesting time. In some implementations, a collection bonus value may define the harvesting duration for individual resources. For example, a collection bonus value may define that the harvest of "virtual corn" (or other virtual item) is "5 minutes" (or other duration). Qualitative and/or quantitative collection bonus values may be considered in other ways.

In some implementations, a parameter value of an ability parameter may be related to one or more of a skill, ability, and/or weapon available for use by the game entity in the virtual space. In some implementations, the skill, ability, and/or weapon may comprise a special skill, a special ability, and/or a special weapon, respectively.

In some implementations, the parameter value for the ability parameter may include one or more of a skill value defining a skill or ability of the game entity, a weapon value defining a weapon available for use by the game entity in the virtual space, and/or other values. The parameter value for the ability parameter may be a qualitative or quantitative value.

In some implementations, a skill value may be an expression related to a skill or ability of the game entity in the virtual space. For example, a skill value may include "super kick/punch", "high jump", "turbo speed", and/or other considerations of qualitative expressions that may be used to define a special skill or ability of a game entity in the virtual space. Skill values may be quantitative values. Qualitative and/or quantitative skill values may be considered in other ways.

In some implementations, a weapon value may be an expression related to a virtual weapon that is to be made available (e.g., unlocked or provided in a virtual inventory associated with the game entity) to the game entity in the virtual space. For example, a weapon value may include "super bazooka", "enchanted sword", and/or other considerations of qualitative expressions that may be used to define a special weapon that may be available to the game entity in the virtual space. Weapon values may be quantitative values. Qualitative and/or quantitative weapon values may be considered in other ways.

In some implementations, the parameter value stored by physical object 40 may be associated with special effects parameter of the first game entity and/or other parameter. A special effects parameter may be related to special visual effects, attack effects, defensive effects, and/or other effects associated with a game entity in the virtual space.

In some implementations, the parameter value for the special effects parameter may include one or more of a visual effect value defining one or more special visual effect, an attack effect value defining one or more attack effects, a defense effect value defining one or more defensive effects, and/or other special effects.

In some implementations, the visual effect value may be an expression that defines a special visual effect in the virtual space for the game entity in the virtual space. A special visual effect may be related to a visual effect during the spawning of the game entity in the virtual space, a visual effect during the death of the game entity, and/or other considerations of special visual effects.

In some implementations, the attack effect value may be an expression that defines a special visual effect in the virtual space during offensive attacks by the game entity.

In some implementations, the defensive effect value may be an expression that defines a special visual effect in the virtual space during defensive moves such as blocks by the game entity in the virtual space.

In some implementations, the parameter values stored by the physical objects may be values that are normally not associated with the associated game entities and/or are values that may not be accessible through gameplay with the associated game entities in the virtual space. For example, the first game entity may normally be associated with a color value (e.g., red or other color) in the executed instance of the virtual space. The physical object 40 may store a color value for a "limited edition" version of the first game entity (e.g. green or other color). By virtue of the receiving component 22 receiving the stored color value, the stored color value may be implemented in the virtual space such that the appearance parameter (e.g., color and/or other attribute) of the first game entity is set to the stored color value. The implementation of the parameter values for parameters of the game entities may be considered in other ways.

As an illustrative example in FIG. 2, the receiving component 22 may be configured to receive a first parameter value 48 and/or other information from reader 38. The first parameter value 38 may be a value for a first parameter 50 of the first game entity associated with physical object 40.

In some implementations, the space component 16 may be configured to implement the received information in the instance of the video game. For example the space component 16 may be configured to implement the first parameter value 48. The first parameter value 48 may set the value for a first parameter 50 for the first game entity in the virtual space independently from gameplay using the first game entity.

Returning to FIG. 1, server 30, client computing platforms (e.g., client computing platform 12), and/or external resources 36 may be operatively linked via one or more electronic communication links. For example, such electronic communication links may be established, at least in part, via network 28 such as the Internet and/or other networks. It will be appreciated that this is not intended to be limiting, and that the scope of this disclosure includes implementations in which server 30, client computing platforms, and/or external resources 36 may be operatively linked via some other communication media.

The external resources 36 may include sources of information that are outside of system 10, external entities participating with system 10, and/or other resources. In some implementations, some or all of the functionality attributed herein to external resources 36 may be provided by resources included in system 10.

Client computing platform 12 may include electronic storage 25, one or more processors 14, and/or other components. Client computing platform 12 may include communication lines, or ports to enable the exchange of information with a network, a server, and/or other client computing platforms. Illustration of client computing platform 12 in FIG. 1 is not intended to be limiting. Client computing platform 12 may include a plurality of hardware, software, and/or firmware components operating together to provide the functionality attributed herein to client computing platform 12.

Server 30 may include electronic storage 34, one or more processors 32, and/or other components. Server 30 may include communication lines, or ports to enable the exchange of information with a network and/or other computing platforms. Illustration of server 30 in FIG. 1 is not intended to be limiting. The server 30 may include a plurality of hardware, software, and/or firmware components operating together to provide the functionality attributed herein to server 30. For example, server 30 may be implemented by a cloud of computing platforms operating together as server 30.

Electronic storage (e.g., 25, 34, and/or 44) may comprise electronic storage media that electronically stores information. The electronic storage media of the electronic storage may include one or both of storage that is provided integrally (i.e., substantially non-removable) with the respective device and/or removable storage that is removably connectable to the respective device. Removable storage may include for example, a port or a drive. A port may include a USB port, a firewire port, and/or other port. A drive may include a disk drive and/or other drive. Electronic storage may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage may include one or more virtual storage resources (e.g., cloud storage, a virtual private network, and/or other virtual storage resources). Electronic storage may store files, software algorithms, information determined by processor(s) and/or other information that enables the respective devices to function as described herein.

Processor(s) (e.g., 14, 32, and/or 42) are configured to provide information processing capabilities in the respective device. As such, processors may include one or more of a digital processor, an analog processor, a digital circuit designed to process information, an analog circuit designed to process information, a state machine, and/or other mechanisms for electronically processing information. Although the processors are shown in FIG. 1 as single respective entities within the respective devices, this is for illustrative purposes only. In some implementations, the processors may include one or more processing units. These processing units may be physically located within the same device, or may represent processing functionality of a plurality of devices operating in coordination.

For example, processor 14 may be configured to execute components 16, 18, 20, and/or 22. Processor 14 may be configured to execute components 16, 18, 20, and/or 22 by software; hardware; firmware; some combination of software, hardware, and/or firmware; and/or other mechanisms for configuring processing capabilities on processor 14.

It should be appreciated that although components 16, 18, 20, and/or 22 are illustrated in FIG. 1 as being co-located within a single processing unit, in implementations in which processor 14 includes multiple processing units, one or more of components 16, 18, 20, and/or 22 may be located remotely from the other components. The description of the functionality provided by the different components 16, 18, 20, and/or 22 described above is for illustrative purposes, and is not intended to be limiting, as any of components 16, 18, 20, and/or 22 may provide more or less functionality than is described. For example, one or more of components 16, 18, 20, and/or 22 may be eliminated, and some or all of its functionality may be provided by other ones of components 16, 18, 20, 22, and/or other components. As another example, processor 14 may be configured to execute one or more additional components that may perform some or all of the functionality attributed to one or more of components 16, 18, 20, and/or 22.

Figure 3:
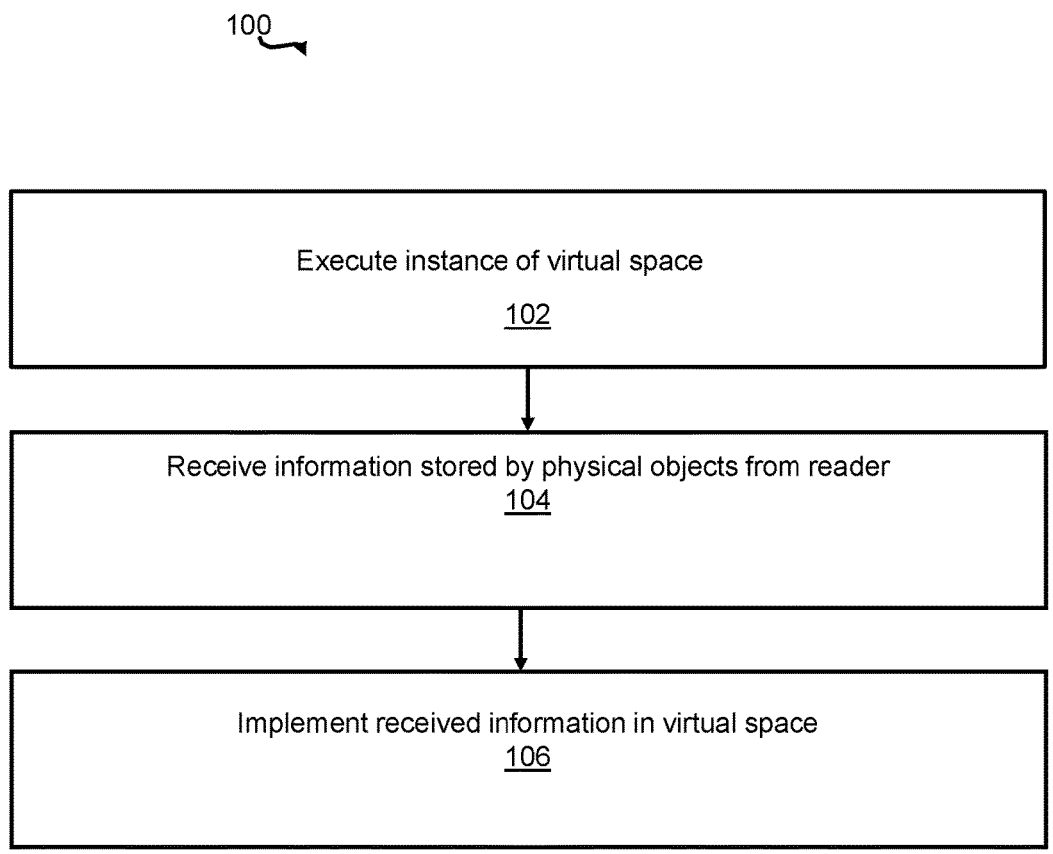
FIG. 3 illustrates an implementation of a method of providing a video game using information stored by physical objects.

FIG. 3 illustrates an example of method 100 of providing a video game using information stored by physical objects. The operations of method 100 presented below are intended to be illustrative. In some embodiments, method 100 may be accomplished with one or more additional operations not described, and/or without one or more of the operations discussed. Additionally, the order in which the operations of method 100 are illustrated in FIG. 3 and described below is not intended to be limiting.

In some embodiments, method 100 may be implemented in a computer system comprising one or more of one or more processing devices (e.g., a digital processor, an analog processor, a digital circuit designed to process information, an analog circuit designed to process information, a state machine, and/or other mechanisms for electronically processing information), storage media storing machine-readable instructions, and/or other components. The one or more processing devices may include one or more devices executing some or all of the operations of method 100 in response to instructions stored electronically on an electronic storage media. The one or more processing devices may include one or more devices configured through hardware, firmware, and/or software to be specifically designed for execution of one or more of the operations of method 100.

At operation 102, an instance of a virtual space and/or video game that takes place in the virtual space may be executed. The instance of the virtual space and/or video game may be implemented to facilitate user participation in the virtual space and/or video game. User participation may include controlling game entities in the virtual space, wherein individual ones of the game entities may be associated with physical objects that store information about the game entities. In some implementations, operation 102 may be performed by one or more physical processors executing a space component the same as or similar to space component 16 (shown in FIG. 1 and described herein).

At operation 104, information stored on a physical object may be received from a reader. The reader may be configured to obtain such information from the physical object using technologies including one or more of RFID, NFC, Bluetooth, and/or any other communication technologies for reading information stored on a physical object. The information may include a parameter value for a parameter of a game entity associated with the physical object, and/or other information. The parameter value stored by the physical object may set the value of the parameter for the associated game entity in the virtual space independently from gameplay using the associated game entity. In some implementations, operation 104 may be performed by one or more physical processors executing a receiving component the same as or similar to receiving component 22 (shown in FIG. 1 and described herein).

At operation 106, the received information may be implemented in the instance of the virtual space such that the parameter value stored by the physical object is implemented in the virtual space as the value of the parameter for the associated game entity. In some implementations, operation 106 may be performed by one or more physical processors executing a space component the same as or similar to space component 16 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system to provide a video game using information stored by physical objects, the system comprising:
   one or more physical processors configured by machine-readable instructions to:
      execute an instance of a video game, and implement the instance of the video game to facilitate user participation in the video game that takes place in a virtual space, wherein user participation includes controlling game entities in the virtual space, and wherein individual ones of the game entities are associated with individual physical objects that store information associated with the individual game entities;
      receive information stored by a first physical object from a reader operatively coupled to or included with the one or more physical processors, the first physical object embodying a physical appearance of a first game entity of the video game, the information stored by the first physical object including a parameter value for a parameter of the first game entity, wherein the parameter value stored by the first physical object is configured to set the value of the parameter for the first game entity in the virtual space independently from gameplay using the first game entity, the parameter comprising a behavior parameter related to one or more of a hit reaction or a collection bonus associated with the game entity in the virtual space; and
      implement the received information in the instance of the video game such that the parameter value stored by the first physical object is implemented in the virtual space as the value of the parameter for the first game entity independently from the gameplay using the first game entity.

2. The system of claim 1, wherein the one or more physical processors are further configured by machine-readable instructions to:
   receive identification information indicating presence of the first physical object detected by the reader.

3. The system of claim 1, wherein the one or more physical processors are further configured by machine-readable instructions such that the parameter comprises an appearance parameter.

4. The system of claim 3, wherein the one or more physical processors are further configured by machine-readable instructions such that the appearance parameter is related to one or more of a color, a height, a limb length, a translucency, a surface material, or a lighting property associated with the game entity in the virtual space.

5. The system of claim 3, wherein the one or more physical processors are further configured by machine-readable instructions such that the parameter value for the appearance parameter includes one or more of a color value, a height value, a limb length value, a translucency value, a surface material value, or a lighting property value.

6. The system of claim 1, wherein the one or more physical processors are further configured by machine-readable instructions such that the parameter value for the behavior parameter includes one or more of a speed value, a hit reaction value, or a collection bonus value associated with the game entity in the virtual space.

7. The system of claim 1, wherein the one or more physical processors are further configured by machine-readable instructions such that the parameter comprises an ability parameter related a skill and/or a weapon that is available for use by the first game entity in the virtual space.

8. The system of claim 1, wherein the one or more physical processors are further configured by machine-readable instructions such that the parameter comprises a special effects parameter related to one or more of a special visual effect, an attack effect, or a defensive effect.

9. A method of providing a video game using information stored by physical objects, the method being implemented in a computer system including one or more physical processors and storage media storing machine-readable instructions, the method comprising:

executing an instance of a video game, and implementing the instance of the video game to facilitate user participation in the video game that takes place in a virtual space, wherein user participation in the video game includes controlling game entities in the virtual space, and wherein individual ones of the game entities are associated with individual physical objects that store information associated with the individual game entities;

receiving information stored by a first physical object from a reader operatively coupled to or included with the one or more physical processors, the first physical object embodying a physical appearance of a first game entity of the video game, the information stored by the first physical object including a parameter value for a parameter of the first game entity, wherein the parameter value stored by the first physical object is configured to set the value of the parameter for the first game entity in the virtual space independently from gameplay using the first game entity, the parameter comprising a behavior parameter related to one or more of a hit reaction or a collection bonus associated with the game entity in the virtual space; and implementing the received information in the instance of the video game such that the parameter value stored by the first physical object is implemented in the virtual space as the value of the parameter for the first game entity independently from gameplay using the first game entity.

10. The method of claim 9, additionally comprising:
receiving identification information indicating presence of the first physical object detected by the reader.

11. The method of claim 9, wherein the parameter comprises an appearance parameter.

12. The method of claim 11, wherein appearance parameter is related to one or more of a color, a height, a limb length, a translucency, a surface material, or a lighting property associated with the game entity in the virtual space.

13. The method of claim 11, wherein the parameter value for the appearance parameter includes one or more of a color value, a height value, a limb length value, a translucency value, a surface material value, or a lighting property value.

14. The method of claim 9, wherein the parameter value for the behavior parameter includes one or more of a speed value, a hit reaction value, or a collection bonus value associated with the game entity in the virtual space.

15. The method of claim 9, wherein the parameter comprises an ability parameter related a skill and/or a weapon that is available for use by the first game entity in the virtual space.

16. The method of claim 9, wherein the parameter comprises a special effects parameter related to one or more of a special visual effect, an attack effect, or a defensive effect of the game entity in the virtual space.

* * * * *